Figure 1:
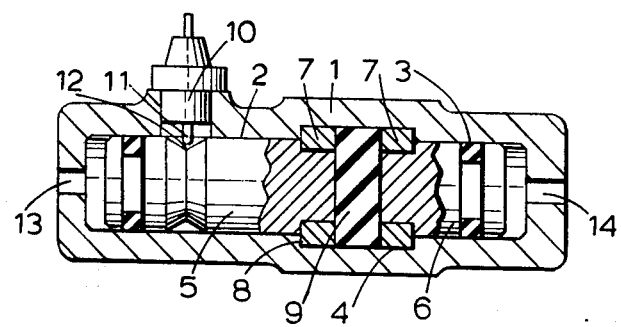

& Clarke

United States Patent [19]

Farr

[11] 4,066,150
[45] Jan. 3, 1978

[54] DUAL HYDRAULIC BRAKING SYSTEMS FOR VEHICLES

[75] Inventor: Glyn Phillip Reginald Farr, Leek Wootton, England

[73] Assignee: Girling Limited, Birmingham, England

[21] Appl. No.: 695,366

[22] Filed: June 14, 1976

[30] Foreign Application Priority Data

June 12, 1975 United Kingdom ............ 25169/75

[51] Int. Cl.² ............................................. F16D 66/00
[52] U.S. Cl. ............................ 188/1 A; 200/82 D; 340/52 C
[58] Field of Search ................. 188/1 A, 349, 151 A; 303/84 A, 6 C; 340/52 C, 242; 200/82 D

[56] References Cited

U.S. PATENT DOCUMENTS

| | | | |
|---|---|---|---|
| 3,336,451 | 8/1967 | Burton | 200/82 D |
| 3,358,446 | 12/1967 | Wortz | 188/1 A X |
| 3,480,333 | 11/1969 | Stelzer | 303/6 C |
| 3,744,595 | 7/1973 | Adams | 188/331 X |
| 3,967,082 | 6/1976 | Remy | 200/82 D |

*Primary Examiner*—George E. A. Halvosa
*Attorney, Agent, or Firm*—Scrivener, Parker, Scrivener & Clarke

[57] ABSTRACT

In a pressure differential warning actuator for detecting when a differential between the pressure of separate brake circuits of an hydraulic braking system exceeds a predetermined value, at least two separate pistons work in separate bore portions in a common housing and are movable between a neutral position when the predetermined value of the differential pressure is not exceeded and an operative position, in which an indicator mechanism is actuated, when the predetermined value is exceeded, and the pistons act through a deformable assembly to restore them from the operative position to the neutral position when the differential is reduced to less than the predetermined value.

6 Claims, 2 Drawing Figures

DUAL HYDRAULIC BRAKING SYSTEMS FOR VEHICLES

SPECIFIC DESCRIPTION

This invention relates to a new or improved pressure differential warning actuator of the kind for detecting when a differential between the pressure of separate brake circuits of an hydraulic braking system exceeds a predetermined value, the actuator comprising an assembly located within a housing and adapted to be exposed over different regions to pressures applied to the brake circuits, and indicator means adapted to be actuated by the assembly when the differential pressure to which the assembly is subjected exceeds the predetermined value, the indicator means automatically being rendered inoperative when the differential pressure is decreased to a value less than the said predetermined value.

In one known construction of pressure differential warning actuator of that kind the assembly comprises a pair of sleeves working in a bore in the housing and a piston working through aligned axial bores in the sleeves and, when the differential pressure is below the predetermined value, the sleeves are prevented from moving in directions towards each other by stop means and the assembly is held in a neutral position, the sleeves and the pistons being keyed together against axial movement of the piston relative to the sleeves in directions away from the stop means to permit movement of one of the sleeves with the piston relative to the other sleeve when the pressure differential exceeds the predetermined value whereby the indicator means is actuated, and, upon the pressure differential being decreased to a value less than the predetermined value, the force applied to the assembly by the pressure acting on the end of the assembly comprising the piston and the said one sleeve is greater than the force applied to the opposite end, which is effective only over the area of the piston, the assembly is restored to the said central position and the indicator means is rendered operative.

According to our invention in a pressure differential warning actuator of the kind set forth the assembly comprises two separate pistons working in longitudinally spaced coaxial bore portions in a common housing and movable between a neutral position in which the indicator means is rendered inoperative when the differential pressure is less than the said predetermined value, and an operative position in which the indicator means is rendered operative when the differential pressure exceeds the said pre-determined value, and a deformable assembly through which the pistons act to restore the pistons from the said operative position to the said neutral position automatically without any change in the effective area of the pistons taking place when the differential pressure decreases to a value less than the predetermined value, the deformable assembly positioned between adjacent ends of the pistons and movable between an inoperative position when the pistons are disposed in the said neutral position and a ratio change position when the pistons are disposed in the said operative position, and the deformable assembly being so constructed and arranged that a force applied from one piston to another to restore the pistons to the said neutral position is greater than the force transmitted therebetween to move the pistons into the said operative position.

Preferably, the end of at least one of the pistons adjacent to the deformable assembly is reduced in area and the reduced area is received in a sleeve so that, when the pistons are moved away from the neutral position, the material of the deformable assembly is deformed to provide a ratio change so that one piston is advanced through a greater distance than the other.

Figure 2:
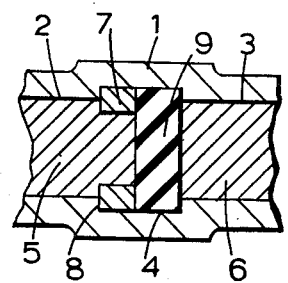

An embodiment of the invention will now be described by way of example with reference to the accompanying drawings in which:

FIG. 1 is a longitudinal section through a pressure differential warning actuator incorporating a resilient block according to the invention, and FIG. 2 is similar to FIG. 1 but incorporates a modified block.

The pressure differential warning actuator illustrated in FIG. 1 of the drawings comprises a housing 1 provided with co-axial bore portions 2 and 3 which are interconnected by a chamber 4 of increased diameter disposed at a position substantially one third of the length of the housing.

Opposed pistons 5 and 6 working in the bore portions 2 and 3 are reduced in diameter at their inner ends to receive sleeves 7 which engage at their inner ends with shoulders 8 at opposite ends of the chamber 4. The outer ends of the sleeves 7 are flush with the ends of the pistons 5 and 6, and the sleeves and the pistonends engage with opposite faces of a deformable assembly, for example a block 9 of resilient material, conveniently rubber, which is housed in the chamber 4.

A switch 10 for operating a warning device is mounted in the wall of the housing 1 and has an operating member 11 which is received in a groove 12 in the wall of the longer piston 5 and which is of oppositely inclined form.

When equal pressure is applied to both pistons from separate brake circuits through ports 13 and 14 in opposite ends of the housing 1, they are held in a neutral position by the block 9. However, when the pressure applied to one piston, conveniently the piston 6, fails, the force in piston 5 is transmitted thereto through the block 9 with the material being deformed to urge the piston 6 towards the adjacent end of the housing 1 and relative to the sleeve 7 in which it is received at its inner end.

This provides a ratio change since the greater force from the piston 5 acts over the total area of the piston 5 and that sleeve 7 relative to the reduced area of the piston 6. Of course, the opposite effect occurs when the brakes are re-applied, after the fault has been rectified, and the intensity of pressure from the piston 6 which acts over a smaller area restores the pistons 5 and 6 to the neutral position.

In the embodiment of FIG. 2 only one piston 5 is of reduced diameter and the end of the other piston 6 of full diameter engages with the face of the block 9 remote from the piston 5. The sleeve 7 engages a shoulder 8 at one end of the chamber 4, and the opposite side of the block 9 engages a corresponding shoulder at the other end of the chamber.

In the two embodiments described above the pistons may be of equal or different diameters compatible with the pressures in the brake circuits which may be different.

I claim:

1. A pressure differential warning actuator comprising detector means for detecting when a differential between the pressures of separate brake circuits of an hydraulic braking system exceeds a predetermined value, a housing provided with a bore, said detector means positioned in said bore, said housing also provided with ports connected to said separate brake circuits, and indicator means actuated by said detector means when said predetermined value is exceeded said detector means comprising at least a first and second piston, said pistons working in separate bore portions of said bore, pressure from said separate brake circuits being connected through said ports to in said pistons, means for moving said pistons between a neutral position in which said indicator means is rendered inoperative when said differential pressure is less than said predetermined value, and an operative position in which said indicator means is rendered operative when said differential pressure exceeds said predetermined value, and a deformable assembly located between adjacent inner ends of said pistons and through which said pistons interact and which is adapted to restore said pistons from said operative position to said neutral position when said differential pressure decreases to a value less than said predetermined value, at least one of said pistons including ratio change means engaging with said deformable assembly such that when said pistons are in said operative position in which one of said pistons is connected to a brake circuit of higher pressure than said other piston, said one piston acts on said deformable assembly over a greater area than said other piston.

2. A pressure differential warning actuator as claimed in claim 1, wherein said deformable assembly comprises a block of rubber.

3. A pressure differential warning actuator as claimed in claim 1, wherein said housing is provided with a chamber of increased diameter which interconnects said separate bore portions, said deformable assembly being located in said chamber.

4. A pressure differential warning actuator as claimed in claim 1, wherein an electrical switch is mounted in said housing, an operating member being provided on said switch, a groove being provided in the wall of said first piston, said operating member being received in said groove such that said switch is operated if said first piston moves in either direction from said neutral position.

5. A pressure differential warning actuator comprising detector means for detecting when a differential between the pressures of separate brake circuits of an hydraulic braking system exceeds a predetermined value, a housing provided with a bore, said detector means positioned in said bore, said housing also provided with ports connected to said separate brake circuits, and indicator means actuated by said detector means when said predetermined value is exceeded, said detector means comprising at least a first and a second piston, said pistons working in separate bore portions of said bore, pressure from said separate brake circuits being connected through said ports to said pistons, means for moving said pistons between a neutral position in which said indicator means is rendered inoperative when said differential pressure is less than said predetermined value, and an operative position in which said indicator means is rendered operative when said differential pressure exceeds said predetermined value, and a deformable assembly through which said pistons act and which is adapted to restore said pistons from said operative position to said neutral position when said differential pressure decreases to a value less than said predetermined value, wherein said housing is provided with a chamber of increased diameter which interconnects said separate bore portions, said deformable assembly is located in said chamber, and reduced diameter portions are provided at the ends of said pistons adjacent to said deformable assembly and within said chamber, sleeves being provided on said reduced diameter portions, and shoulders being provided at each end of said chamber with which said sleeves engage.

6. A pressure differential warning actuator comprising detector means for detecting when a differential between the pressures of separate brake circuits of an hydraulic braking system exceeds a predetermined value, a housing provided with a bore, said detector means positioned in said bore, said housing also provided with ports connected to said separate brake circuits, and indicator means actuated by said detector means when said predetermined value is exceeded, said detector means comprising at least a first and a second piston, said pistons working in separate bore portions of said bore, pressure from said separate brake circuits being connected through said ports to said pistons, means for moving said pistons between a neutral position in which said indicator means is rendered inoperative when said differential pressure is less than said predetermined value, and an operative position in which said indicator means is rendered operative when said differential pressure exceeds said predetermined value, and a deformable assembly through which said pistons act and which is adapted to restore said pistons from said operative position to said neutral position when said differential pressure decreases to a value less than said predetermined value, wherein said housing is provided with a chamber of increased diameter which interconnects said separate bore portions, said deformable assembly is located in said chamber, and a reduced diameter portion is provided at the end of said first piston adjacent to said deformable assembly and within said chamber, a sleeve being provided on said reduced diameter portion, and shoulders are provided at each end of said chamber, said sleeve engaging one of said shoulders and said deformable assembly engaging the other of said shoulders.

* * * * *